United States Patent
Brown et al.

[19]

[11] Patent Number: 5,924,602
[45] Date of Patent: *Jul. 20, 1999

[54] AIR OPERATED LIQUID PUMP

[75] Inventors: C. Brandon Brown; Steven W. Post, both of Jonesboro, Ark.

[73] Assignee: McNeil (Ohio) Corporation, St. Paul, Minn.

[*] Notice: This patent is subject to a terminal disclaimer.

[21] Appl. No.: 09/113,480

[22] Filed: Jul. 10, 1998

Related U.S. Application Data

[63] Continuation-in-part of application No. 08/909,281, Aug. 11, 1997, Pat. No. 5,779,105.

[51] Int. Cl.⁶ ..................................................... G01F 11/00
[52] U.S. Cl. ............................ 222/262; 222/334; 417/553
[58] Field of Search .................................... 222/334, 258, 222/261, 262, 263, 386, 380; 417/511, 553

[56] References Cited

U.S. PATENT DOCUMENTS

| | | |
|---|---|---|
| 1,856,372 | 5/1932 | Buchet . |
| 1,918,833 | 7/1933 | Carter . |
| 1,939,943 | 12/1933 | Barks . |
| 1,949,497 | 3/1934 | Stafford et al. . |
| 2,113,333 | 4/1938 | Piquerez . |
| 2,134,735 | 11/1938 | Reinhold . |
| 2,409,619 | 10/1946 | Fitch ........................................ 222/386 |
| 2,464,030 | 3/1949 | Engstrom . |
| 2,505,839 | 5/1950 | Scovell . |
| 2,985,359 | 5/1961 | Hanje . |
| 3,752,604 | 8/1973 | Dorn ........................................ 417/511 |
| 3,980,209 | 9/1976 | Collar ................................... 222/334 X |
| 4,170,253 | 10/1979 | McArthur ............................ 222/334 X |
| 4,298,144 | 11/1981 | Pressl . |
| 4,826,050 | 5/1989 | Murphy et al. ...................... 222/334 X |
| 5,535,926 | 7/1996 | Blitz et al. ................................ 222/334 |
| 5,553,756 | 9/1996 | Topper et al. ........................ 222/380 X |
| 5,634,574 | 6/1997 | McArthur et al. ....................... 222/334 |
| 5,779,105 | 7/1998 | Brown et al. . |

*Primary Examiner*—Kevin P. Shaver
*Attorney, Agent, or Firm*—Howell & Haferkamp, LC

[57] ABSTRACT

An air operated liquid pump includes a pump with a reciprocating plunger driven by a piston contained in a cylinder. The plunger is connected to and reciprocates a dispensing piston that moves between two positions relative to the plunger to open and close flow through valve holes that pass through the dispensing piston.

18 Claims, 7 Drawing Sheets

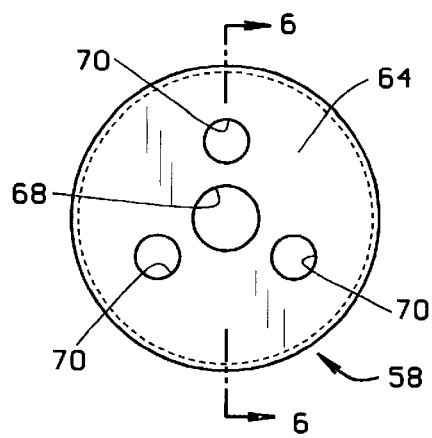 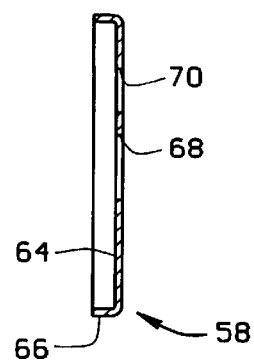
FIG. 5    FIG. 6
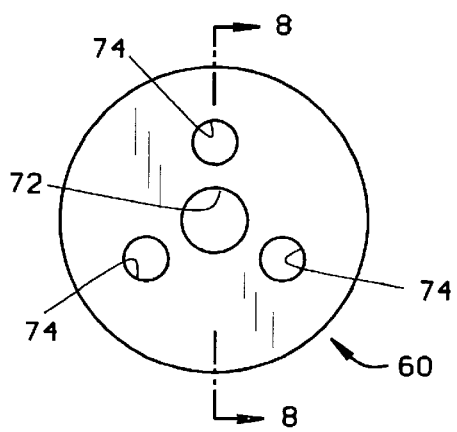 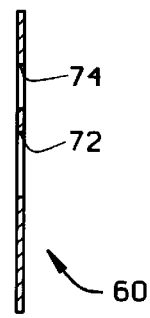
FIG. 7    FIG. 8
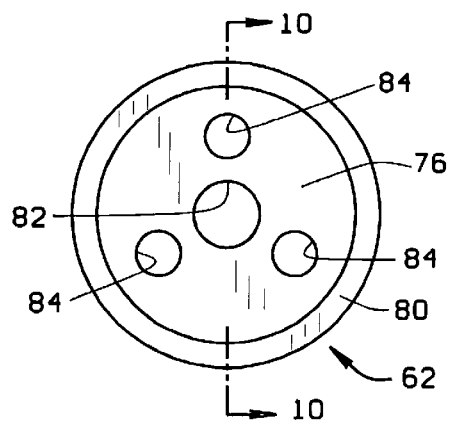 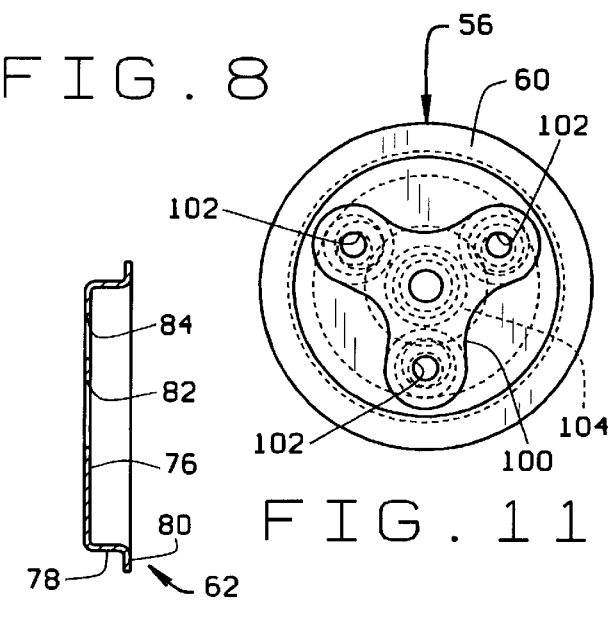
FIG. 9    FIG. 10    FIG. 11

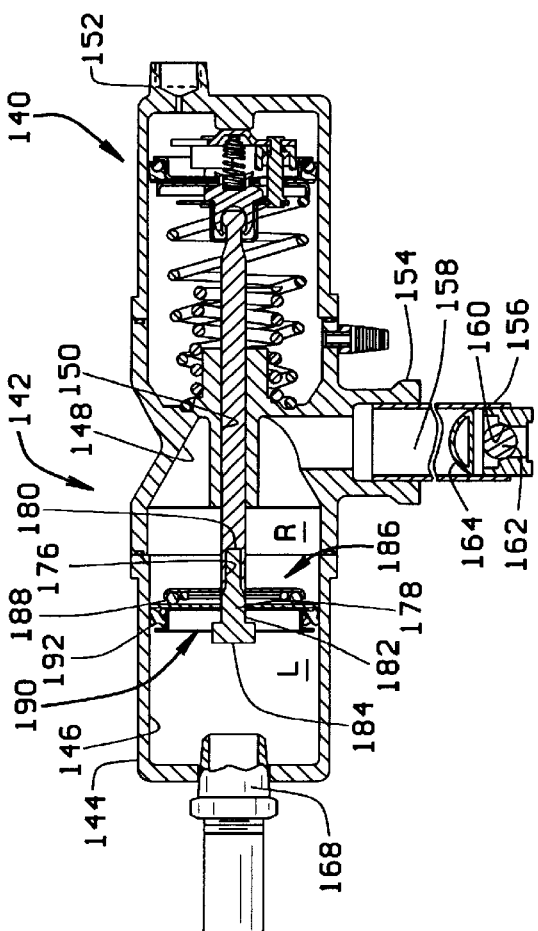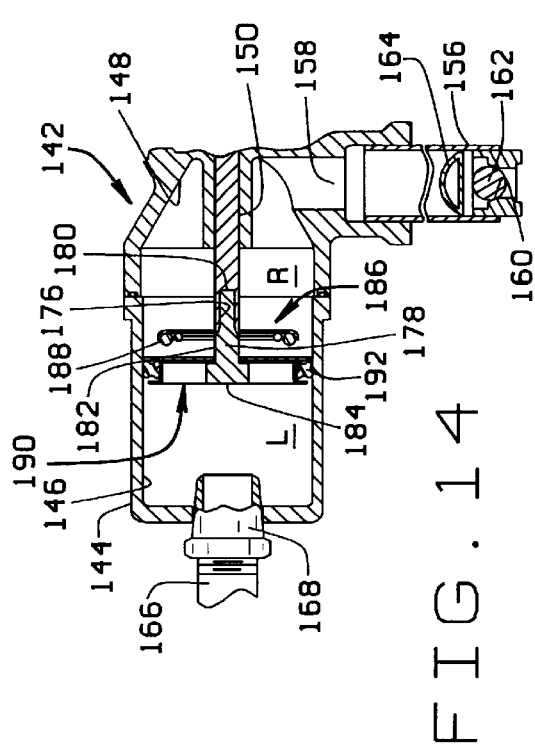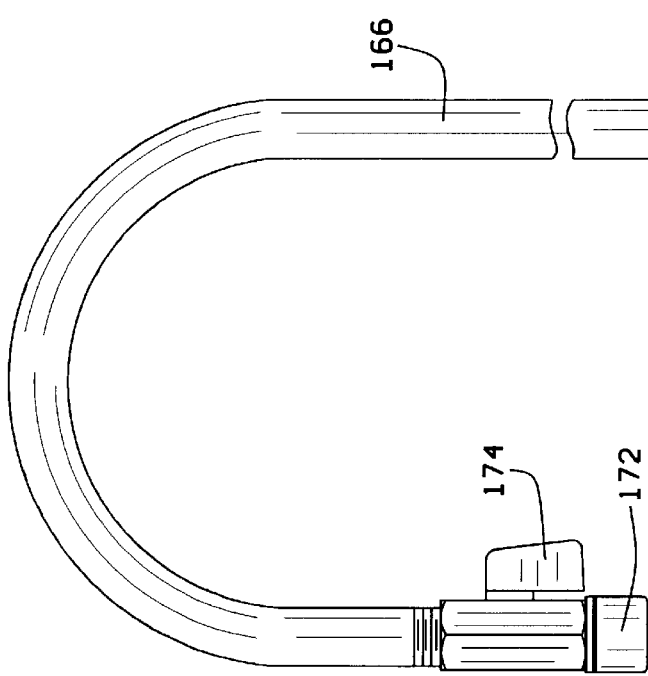
FIG. 14
FIG. 13

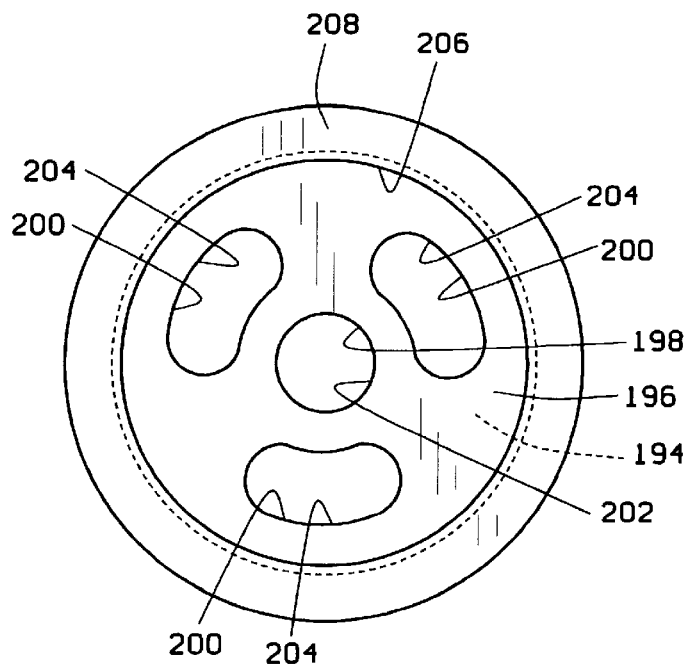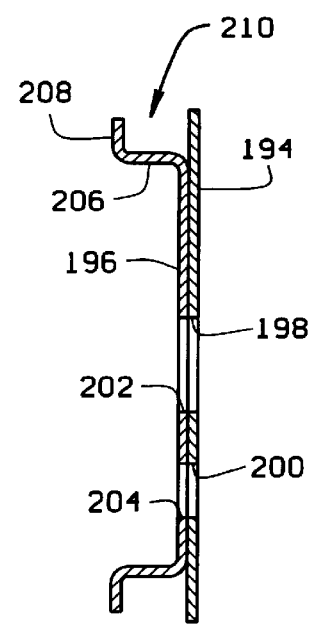
FIG. 15    FIG. 16
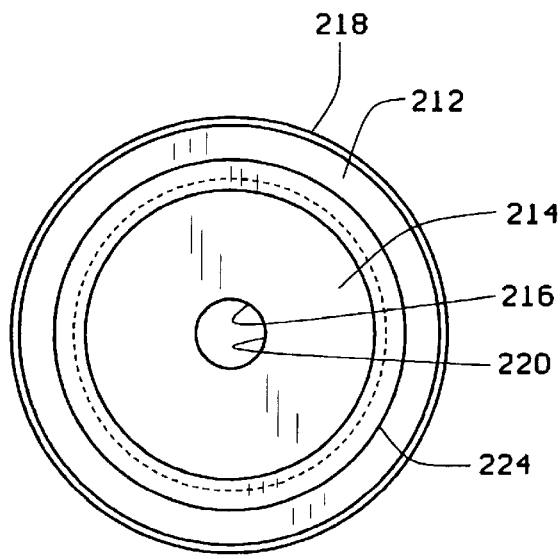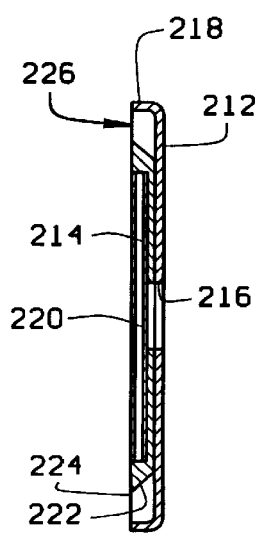
FIG. 17    FIG. 18

AIR OPERATED LIQUID PUMP

This application is a continuation-in-part of U.S. patent application Ser. No. 08/909,281, filed Aug. 11, 1997, and now U.S. Pat. No. 5,779,105, issued Jul. 14, 1998.

FIELD OF THE INVENTION

This invention relates to an air operated liquid pump, and in particular to a pump with a reciprocating plunger driven by a piston in a cylinder where the plunger reciprocates a dispensing piston that moves between two positions relative to the plunger to open and close flow through valve holes.

BACKGROUND OF THE INVENTION

In one type of air operated grease gun previously available, a reciprocating plunger ejects grease from the tip of the gun. The plunger is driven by a piston reciprocating in a cylinder. Air pressure in the cylinder advances the piston in the cylinder against the force of a return spring, until the piston reaches a position where a release opens a seal over apertures in the piston, allowing the air pressure to escape and the piston to retract under the force of the return spring.

This type of air operated grease gun suffers from at least two disadvantages. The opening of the seal results in a significant pressure drop in the pressure of the grease ejected by the gun, resulting in large swings in the grease application pressure. Furthermore, the piston must be relatively large and rigid, and carefully manufactured to close tolerances so that the seal can close all of the apertures so that the piston functions properly. This makes the piston very expensive, increasing the total cost of the grease gun.

SUMMARY OF THE INVENTION

The grease gun of the present invention is of simple and inexpensive construction. It reduces the larger pressure swings that can occur in prior art air operated grease guns. Moreover, the construction eliminates the need for a large, and carefully and expensively fabricated piston, allowing the piston to be fabricated from inexpensive stamped parts.

Generally, the air operated grease gun of the present invention comprises a reciprocating grease plunger for ejecting grease. A piston, connected to the plunger for operating the plunger, is slidably mounted in a cylinder to move between a retracted position and an advanced position. A return spring resiliently biases the piston to its retracted position. There is a valve for selectively connecting the cylinder to a source of gas under pressure to advance the piston against the return spring. The piston has a plurality of apertures therein, and each aperture has an individual seal. There is a release for opening the individual seals to relieve the pressure behind the cylinder and allow it to retract under the force of the return spring.

The use of individual seals for the apertures, rather than a large seal encompassing all of the apertures, reduces the pressure differential at the point where the release opens the seals, thereby allowing the air operated grease gun to operate at a more constant pressure. Furthermore the reduction in the size of the seal means larger tolerances can be used, eliminating the need for a large, carefully and expensively machined piston.

The air motor of the grease gun is also employed in a liquid dispenser that dispenses larger quantities of liquid at a greater flow rate.

These and other features and advantages will be in part apparent, and in part pointed out hereinafter.

BRIEF DESCRIPTION OF THE DRAWINGS

FIG. 5 is a bottom plan view of the return spring seat;

FIG. 6 is a cross sectional view of the return spring seat taken along the plane of line 6—6 in FIG. 5;

FIG. 7 is a plan view of the washer;

FIG. 8 is a cross sectional view of the washer taken along the plane of line 8—8 in FIG. 7;

FIG. 9 is a front plan view of the U-cup seat;

FIG. 10 is a cross sectional view of the U-cup seat taken along the plane of line 10—10 in FIG. 9;

FIG. 11 is a rear end view of the piston;

FIG. 13 is a vertical, longitudinal cross-sectional view of an air operated dispenser similar to the grease gun of FIG. 1, showing a dispensing piston of the dispenser in its advanced or discharge position in a dispensing chamber;

FIG. 14 is a partial view similar to FIG. 13 showing the dispensing piston in its retracted or charge position;

FIG. 15 is a front view of the dispensing piston;

FIG. 16 is a cross-section view of the dispensing piston;

FIG. 17 is a front view of a seal; and

FIG. 18 is a cross-section view of the seal.

Corresponding reference numerals indicate corresponding parts through out the drawings.

DETAILED DESCRIPTION OF THE PREFERRED EMBODIMENT

Figure 1:
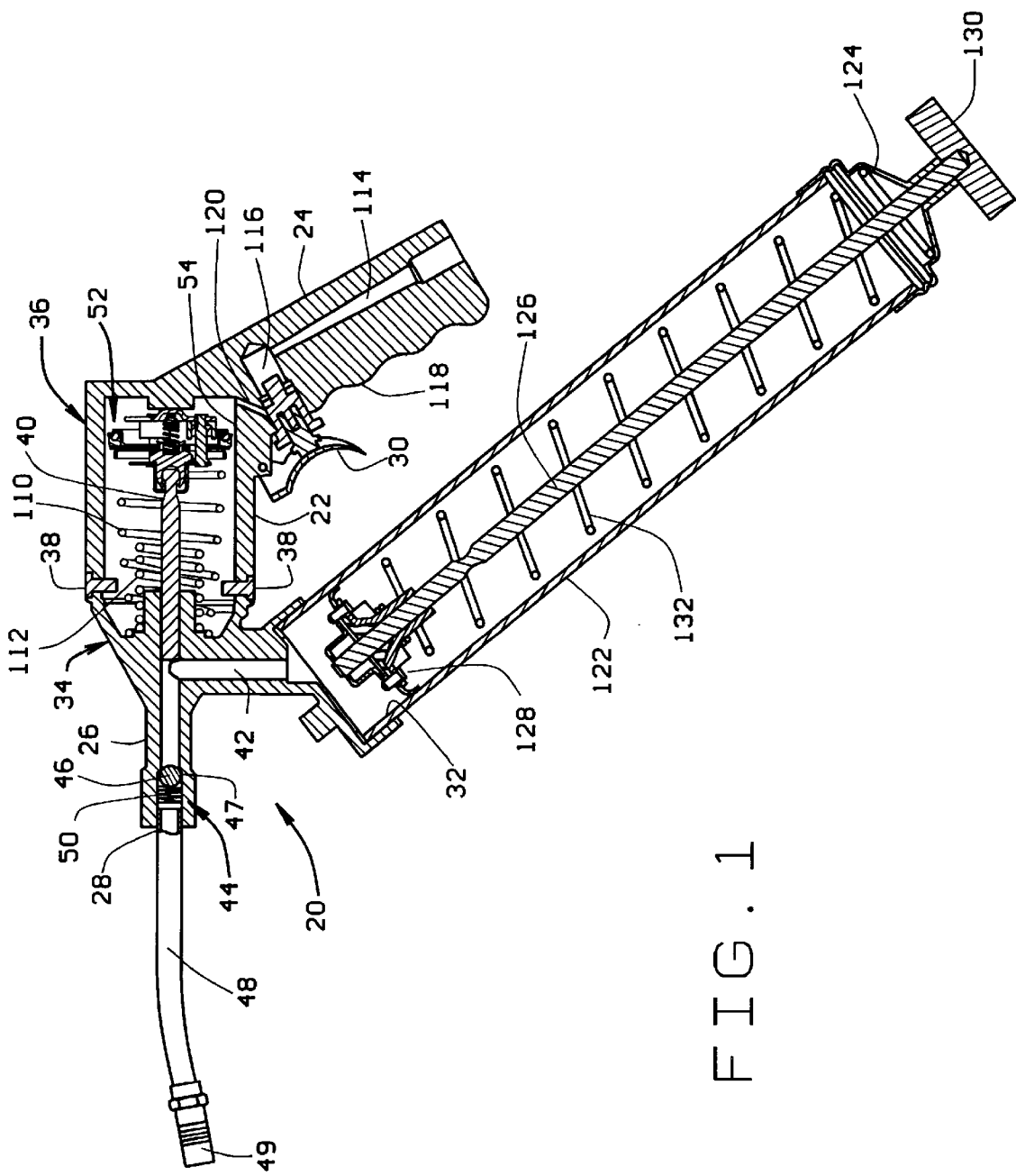
FIG. 1 is a vertical, longitudinal cross-sectional view of an air operated grease gun constructed according to the principles of this invention with the piston in its retracted position in the cylinder.
Figure 2:
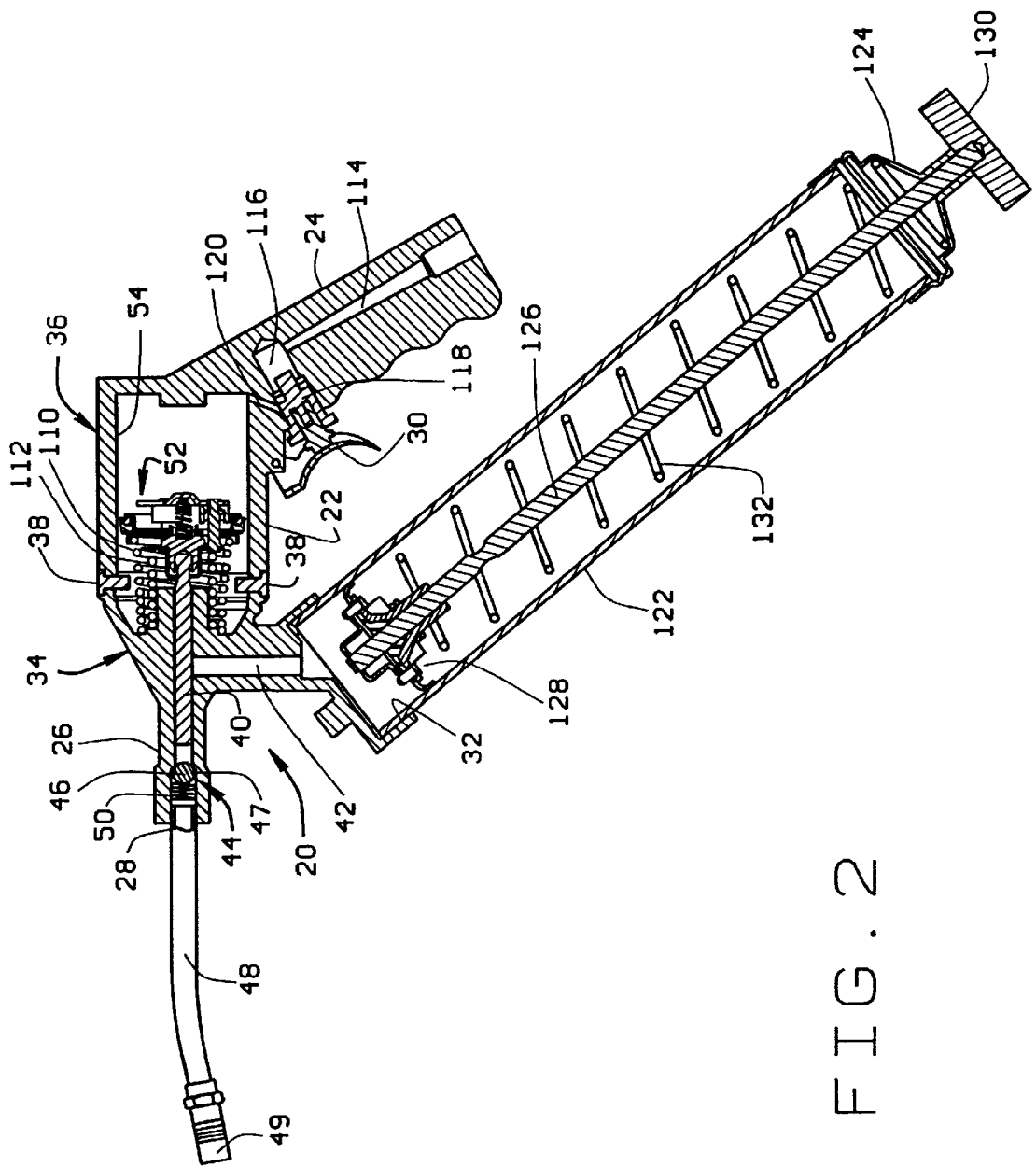
FIG. 2 is a vertical, longitudinal cross-sectional view of the grease gun, with the piston in its extended position.

An air operated grease gun constructed according to the principles of this invention is indicated generally as 20 in FIGS. 1. and 2. The gun 20 comprises a body 22 with a hand grip 24 extending from the rear of the body, and a barrel 26 extending from the front of the body having an opening 28 therein for ejecting grease. A trigger 30 is mounted adjacent the hand grip 24 for operating the grease gun 20. A socket 32 for mounting a supply of grease, is located on the underside of the body 22, adjacent the front. The body 22 is preferably formed from interfiling front and back sections 34 and 36, secured together with screws 38.

The gun 20 operates by the reciprocation of a plunger 40 in the barrel 26. The back stroke of the plunger 40 draws grease from the grease supply connected to the socket 32 via passage 42, and the forward stroke of the plunger pushes grease through the opening 28 of the barrel 26, which has a check valve 44. The check valve 44 comprises a ball 46, resiliently biased by spring 50, that seats against a shoulder 47 formed inside the barrel 26. The check valve 44 allows grease to flow out of the barrel 26 on the forward stroke of the plunger 40, but prevents reflux on the back stroke of the plunger. An extension tube 48 having a fitting 49 on its end, can be installed in the opening 28 of the barrel 26 to direct the delivery of the grease from the gun 20. The spring 50 separates the ball 46 from the extension tube 48.

Figure 3:
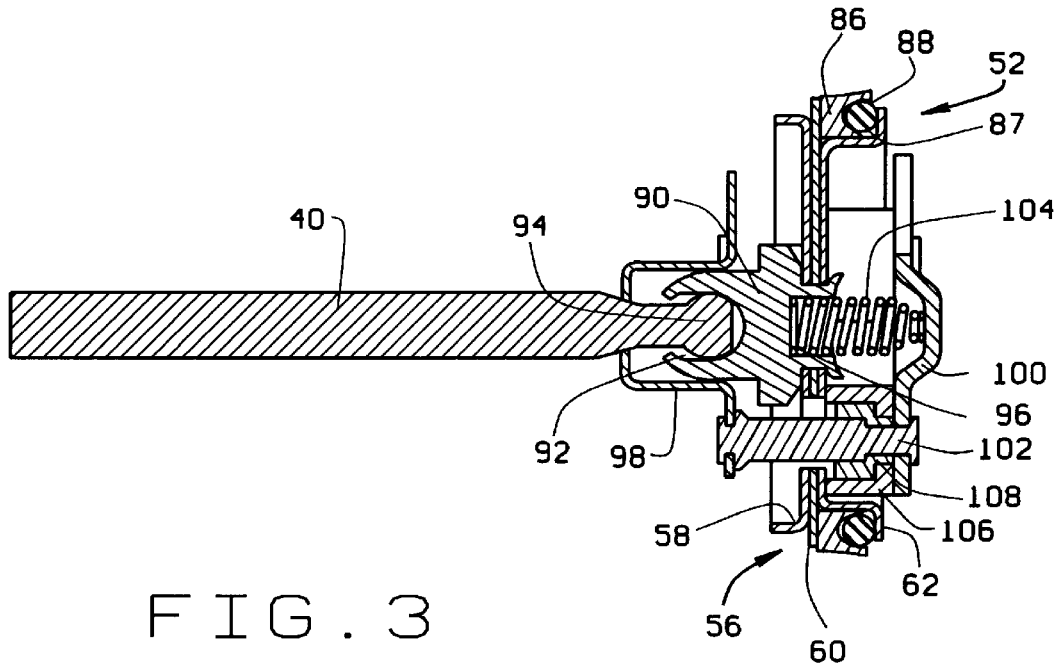
FIG. 3 is an enlarged view of the piston that reciprocates in the cylinder in the body of the gun with the apertures closed.
Figure 4:
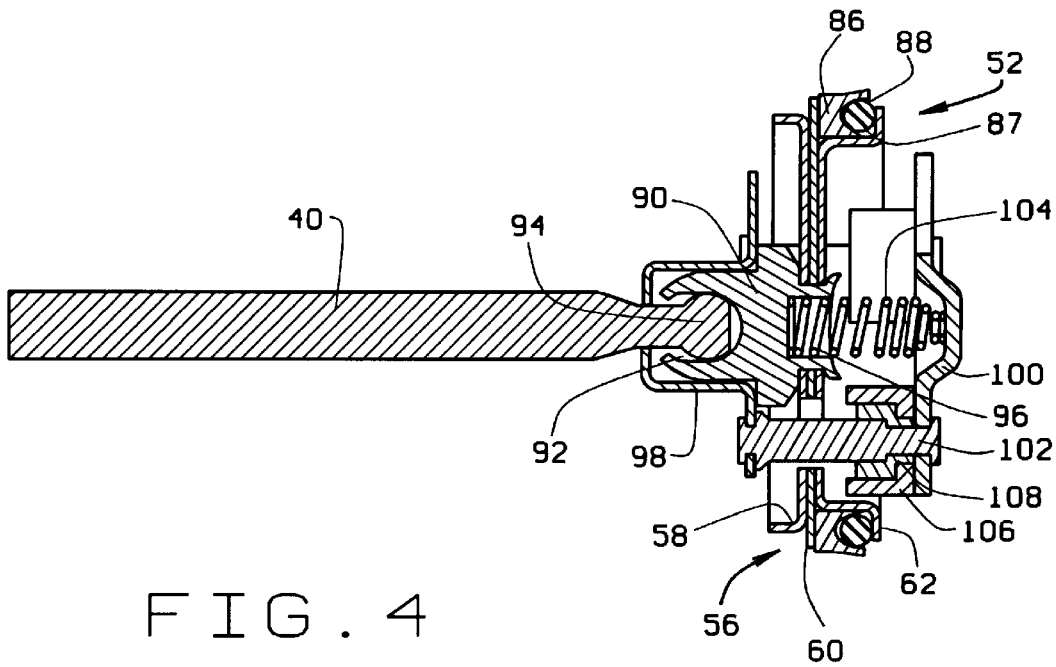
FIG. 4 is an enlarged view of the piston with the apertures open.

The plunger 40 is driven by the reciprocation of piston 52 in cylinder 54 inside the body 22. As best shown in FIGS. 3 and 4, the piston 52 comprises a unique U-cup seat weldment 56 formed from three pieces, a shallow cup-shaped return spring seat 58 (FIGS. 5 and 6), a washer 60, and a dish-shaped U-cup seat 62. The return spring seat 58 has a generally circular bottom 64 surrounded by a cylindrical rim 66, and a central opening 68 surrounded by three apertures 70. The washer 60 (FIGS. 7 and 8) is generally circular, with larger diameter than the return spring seat 58. There is a central opening 72 in the washer, surrounded by three apertures 74. The U-cup seat 62 has a generally circular bottom 76 surrounded by a cylindrical rim 78 having a radially extending flange 80. There is a central opening 82 in the U-cup seat 62 (FIGS. 9 and 10), surrounded by three apertures 84. The return spring seat 58, the washer 60, and the U-cup seat 62 can each be made inexpensively, for example by stamping, and they are secured together with their respective apertures aligned, for example with spot welds.

An annular U-cup 86, having a groove 87 in one face, is mounted with an O-ring 88 in the groove, on the U-cup seat weldment 56, between the washer 60 and the U-cup seat 62, for sealing with the wall of the cylinder 54.

An aligning socket 90 is located on the forward side of the weldment 56, and comprises a forward section with a socket 92 for receiving and engaging the rounded end 94 of the plunger 40, and a rearward section that extends through the aligned central apertures in the weldment, and has a socket 96 therein for seating the valve spring, as described below. The socket 92 is swaged to enclose the end 94 of the plunger 40, and retain it while permitting the plunger to swivel. There is a hat-shaped valve guide 98 on the front side of the weldment 56, and a three-lobed washer 100 on the rear side of the weldment, connected by three pins 102, one pin extending through each of the apertures in the weldment. A valve spring 104 extends between the rearward section of the aligning socket 90 and the three-lobed washer 100, to resiliently bias the washer 100 away from the weldment 56.

A cup shaped rubber packing 106 surrounds each pin 102 and is held against the washer 100 with a spacer 108, that is engaged by a shoulder on the pin 102. The cup-shaped packing 106 are adapted to engage the edge margins of the apertures through the weldment 56 and seal them.

A return spring 110 is positioned in the cylinder 54, in front of the piston 52, extending between the front of the cylinder and the return spring seat 58. An actuation spring 112 is also positioned in the cylinder 54, in front of the piston 52 at the front of the cylinder, concentrically inside the return spring 110 in position so that when the piston is at the front of the cylinder, the actuation spring engages the valve guide 98.

The handle 24 is adapted to be connected to a source of air under pressure, and has a passage 114 therein extending to a trigger chamber 116. The trigger 30 is pivotally mounted to the body 22 of the gun, and operates a valve 118 that selectively connects the trigger chamber 116 to the back of the cylinder 54 via passage 120.

The socket 32 is adapted to mount a grease tube 122, which is closed with an end cap 124. A follower rod 126 extends through the end cap 124 and has a follower assembly 128 on the end inside the tube 122, and a handle 130 on the end outside the tube. A follower spring 132 is mounted concentrically over the follower rod 126, between the follower assembly 128 and the inside of the cap 124, to resiliently bias the follower assembly upwardly in the tube 122.

In operation, the grease tube 122 is filled with grease, either by installing a prefilled cartridge in the tube, or by drawing grease from a bulk supply into the tube with the handle 130, or by pumping it into the tube. The handle 24 of the grease gun 20 is then connected to a source of air under pressure, and the gun is ready for use.

In the retracted position, the apertures through the weldment 56 forming the piston 52 are sealed with the packing 106 because the return spring 110 pushes the piston rearwardly with sufficient force to overcome the force of spring 104 and hold the piston against the packing 106 on the washer 100. When the trigger 30 is depressed, it operates the valve 118 to allow air under pressure into the back of the cylinder 54. The air pressure advances the piston 52 in the cylinder 54 against the return spring 110, until the valve guide 98 engages the actuator spring 112. Continued forward movement of the piston 52 compresses the actuator spring 112 against the valve guide 98 until the force of the actuator spring on the valve guide, and the force of the spring 104 on the washer 100 unseat the packing 106 from around the apertures. This allows the air pressure to escape from behind the piston 52, allowing the return spring 110 to return the piston to the back of the cylinder 54 where the piston is again pressed against the packing 106 to seal the apertures, and the cycle continues until the trigger 30 is released.

The reciprocation of the piston 52 causes the plunger 40 to reciprocate. On the back stroke of the plunger 40, grease is drawn from the tube 122, through the passage 42 into the barrel 26 of the gun 20. On the forward stroke of the plunger 40, the plunger pushes grease out the opening 28 of the barrel 26, through the check valve 44, through extension tube 48 and out fitting 49.

When the trigger 30 is finally released, pressurized air from the trigger chamber 116 is cut off from the cylinder 54, and any air in the cylinder behind the piston 52 can vent through the trigger mechanism, allowing the return spring 110 to return the piston to the back of the cylinder ready for use.

In contrast to prior art air operated grease guns, the grease gun 20 of the present invention employs separate packing 106 for each aperture, rather than a single large packing or seal. This reduces the pressure differential at the valve shift point—the point where the force of the valve spring 104 and the actuation spring 112 exceeds the air pressure differential across the piston. The reduction of this differential provides a more even application pressure. Moreover, the large seal employed in the prior art required that the piston be fairly substantial and machined to close tolerances to seal across the relatively large diameter of the packing or sealing member. The individual packing 106 employed with the present invention allow the use of a smaller and less precise piston that can be formed from inexpensive formed (e.g. stamped) pieces, rather that expensive and elaborately machined parts.

Figure 12:
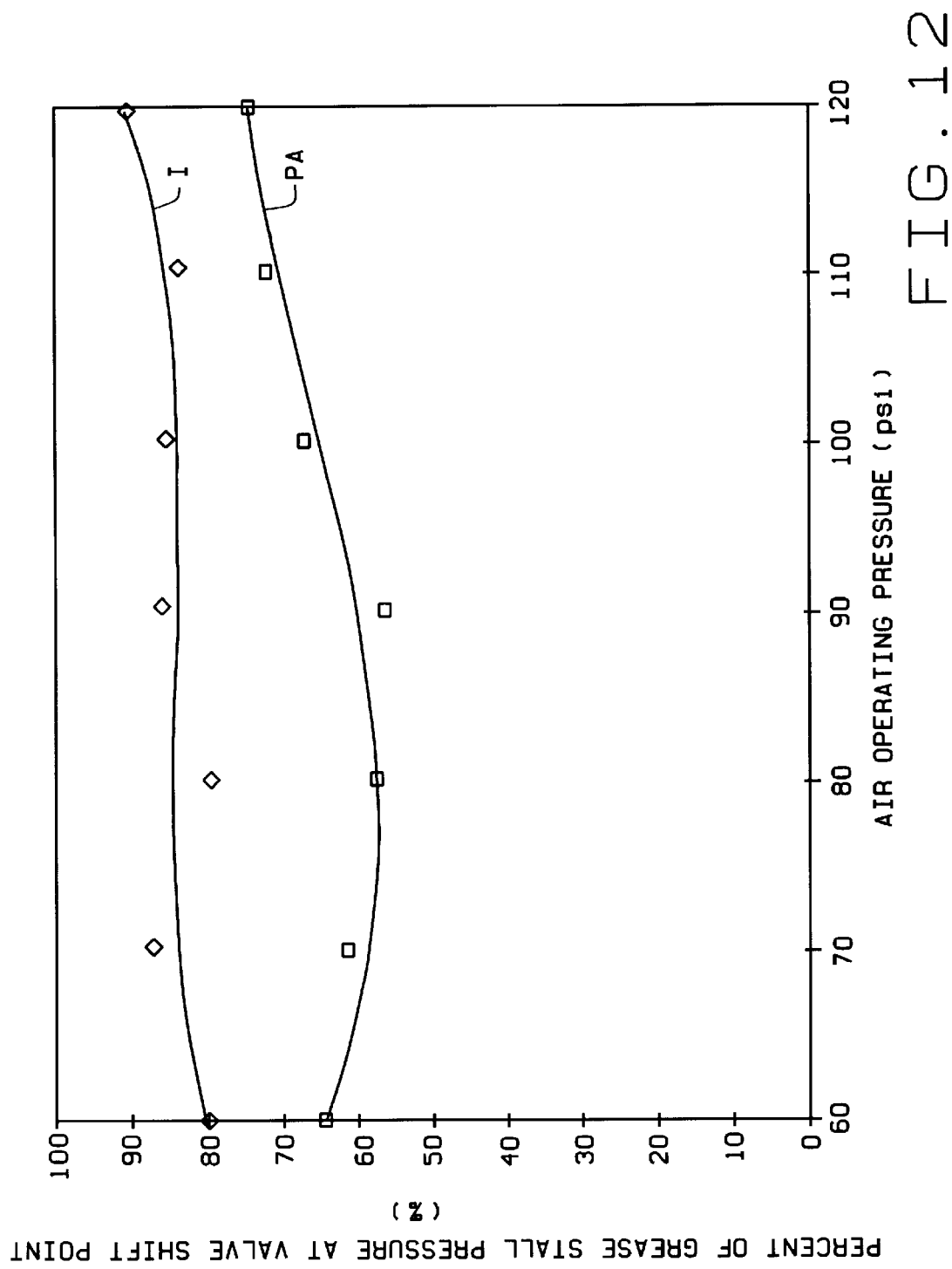
FIG. 12 is a graph of the percent of grease stall pressure of the valve shift point versus operating air pressure for a grease gun constructed according to the present invention and a prior art grease gun.

FIG. 12 is a graph of the percent of grease stall pressure at valve shift point versus air operating pressure for a grease gun constructed according to the principles of the present invention (I) versus a prior art grease gun (PA). FIG. 12 illustrates that a grease gun constructed according to the principles of the present invention (I) has a valve shift point that is a higher percentage of its stall pressure than a typical prior art grease gun (PA). This means that for a given operating pressure and piston ratio, a grease gun constructed according the principles of the present invention will be able to operate in its automatic reciprocating mode at a higher pressure than a conventional prior art grease gun, or put another way a conventional grease gun will cease to function in the automatic reciprocating mode at a lower pressure than a grease gun constructed according to the principles of the present invention.

FIGS. 13–18 show a variation in the use of the air motor that was employed in the grease gun 20 described earlier. The reciprocating air motor 140 is identical in construction and operation to that employed in the grease gun 20 and therefore its component parts and its operation will not be described again here. The component parts of the air motor 140 that are same as those employed in the grease gun 20 are given the same reference numerals follows a prime ('). The primary differences in the dispenser 142 shown in FIGS. 13 and 14 and the grease gun 20 described earlier are in the manner in which compressed air is provided to the air motor 140, the manner in which grease is supplied to the dispenser 142, and the construction of the dispenser 142 itself.

The dispenser 142 includes a housing 144 that, in the preferred embodiment, is constructed of metal. The housing 144 encloses the cylinder 54' and a cylindrical dispensing chamber 146. The interior of the cylinder 54' and the interior of the dispensing chamber 146 are separated by an internal wall 148 having a plunger bore 150 passing therethrough. The plunger 40' extends in sliding engagement through the plunger bore 150.

Instead of the hand grip 24 and the air pressure supply controlled by the trigger 30, an air pressure inlet fitting 152 is provided on the housing 144 and communicates with the air pressure side of the piston 52' in the air motor cylinder 54'. The fitting 152 shown has internal screw threading to accept a complimentary externally threaded coupling that attaches an air pressure hose to the housing 144 supplying air under pressure to the cylinder 54'. A separate manual control would then be provided on the air pressure hose to control the supply of air under pressure to the cylinder 54'.

The socket 32 of the grease gun 20 is replaced by a liquid supply inlet fitting 154. This liquid supply fitting 154 is also internally threaded to accept a complimentary externally threaded liquid supply conduit 156. The conduit 156 directs a supply of liquid, such as lubricant or some other type of vehicle fluid, through the supply inlet fitting 154 and a passage 158 in the housing 144 into the dispensing chamber 146. The air pressure inlet fitting 152 and the liquid supply inlet fitting 154 are only examples of two known ways of supplying air pressure to operate the air motor 140 and a liquid to be dispensed by the dispenser 142. Other methods of supplying a gas under pressure to operate the air motor 140 and supplying a liquid to the dispenser 142 may be employed.

A check valve including a ball seat 160, a ball valve 162 and a cage stop 164 is positioned in the liquid supply conduit 156. The ball valve 162 seats on the ball seat 160 and prevents a reverse flow of liquid from the dispensing chamber 146 and through the liquid supply conduit 156. When a supply of liquid is directed through the conduit 156 from an external source (not shown) it unseats the ball valve 162 from the seat 160 and continues through the supply inlet fitting 154 and the passage 158 and into the dispensing chamber 146.

A dispensing hose 166 is connected with the dispensing chamber 146 by a coupling 168. The coupling 168 is screw threaded through a side wall of the housing 144 to communicate with the dispensing chamber 146. At the opposite end of the dispensing hose 166 is a spigot 172 that contains a valve that is selectively opened and closed by manipulation of a manual handle 174.

The plunger 40' extends through the plunger bore 150 and into the interior of the dispensing chamber 146. A distal end of the plunger 40' has a cavity 176 with internal screw threading. A piston rod 178 has one end with external screw threading 180 threaded into the plunger cavity 176. From its threaded end 180, the piston rod 178 has a smooth, cylindrical exterior surface 182 that extends to an enlarged head 184 at the opposite end of the piston rod from the threaded end 180.

A seal 186 is secured to the plunger 40' between the connection of the piston rod 178 to the plunger 40'. The seal supports a resilient O-ring 188. A dispensing piston 190 is supported on the exterior surface 182 of the piston rod 178 between the seal 186 and the piston rod head 184. The dispensing piston 190 is mounted on the piston rod 178 for sliding movement of the dispensing piston between charge and discharge positions of the dispensing piston relative to the plunger 40'. The dispensing piston 190 supports a resilient, annular sealing ring 192 around its periphery.

The dispensing piston 190 has a simple, inexpensive construction that essentially consists of three parts, two of which are shown in FIGS. 15 and 16. The dispensing piston 190 includes a flat, circular piston washer 194 secured to a circular piston ring seat 196. Both the piston washer 194 and the piston ring seat 196 are preferably formed by a metal stamping process and are secured together side by side as shown in FIGS. 15 and 16 by spot welds. The piston washer 194 has a center hole 198 that is dimensioned to enable the washer to slide freely over the piston rod exterior surface 182. In addition, the piston washer 194 has three oblong flow-through holes 200 spatially arranged around the center hole 198. The piston ring seat 196 also has a center hole 202 that is the same size as the piston washer center hole 198 and aligns with the piston washer center hole with the piston washer 194 and piston ring seat 196 spot welded together as shown in FIGS. 15 and 16. In addition, the piston ring seat 196 also has three flow-through holes 204 spatially arranged around its center hole 202 and shaped and positioned to coincide with the flow-through holes 200 of the piston washer 194 with the piston washer and the piston ring seat spot welded together. The stamping of the piston ring seat 196 forms an annular shoulder 206 around its periphery and an annular flange 208 adjacent the shoulder. The stamping of the annular shoulder 206 and the annular flange 208 forms an annular groove 210 with the periphery of the piston washer 194 that extends completely around the periphery of the dispensing piston 190. The groove 210 receives the sealing ring 192 therein and is dimensioned so that the sealing ring supported in the groove 210 will slide in sealing engagement against the interior surface of the dispensing chamber 146.

The seal 186 also has a simple, inexpensive construction that essentially consists of three parts, two of which are shown in FIGS. 17 and 18. The seal includes a circular seal washer 212 secured to a circular O-ring retainer 214. Preferably both the seal washer 212 and the O-ring retainer 214 are formed by an inexpensive metal stamping process and are secured together by spot welds. The seal washer 212 has a center hole 216 that is dimensioned to enable the threaded end 180 of the piston rod 178 to pass therethrough, but is smaller than the exterior diameter of the plunger 40'. The stamping process forms a peripheral flange 218 around the seal washer 212. The exterior diameter of the seal washer 212 is slightly smaller than that of the dispensing piston 190 so that it will not approach the interior surface of the dispensing chamber 146 when mounted on the plunger 40'. The O-ring retainer 214 also has a center hole 220 that is dimensioned the same size as the seal washer center hole 216 and aligns therewith with the seal washer 212 and O-ring retainer 214 secured together as shown in FIGS. 17 and 18. The stamping of the O-ring retainer 214 forms a flange around its periphery that has a tapered exterior surface 222 that angles radially inwardly toward the seal washer 212 with the O-ring retainer secured to the seal washer as shown in FIG. 18. The tapered flange surface 222 forms a circular edge 224 at the outer most periphery of the O-ring retainer 214 and also forms an annular groove 226 on a side of the seal 186 that opposes the dispensing piston 190 with both the seal and the piston mounted on the plunger 40'. The annular groove 226 is dimensioned slightly smaller than the diameter of the O-ring 188 that is received in the groove as shown in FIGS. 13 and 14 and the circular edge 224 holds the O-ring 188 securely in the annular groove 226. The O-ring 188 supported by the seal 186 has a diameter dimensioned large enough to completely surround the flow-through holes 200 of the piston washer and the flow-through holes 204 of the piston ring seat.

The dispensing piston 190 is mounted on the piston rod 178 by inserting the piston rod through the piston ring seat center hole 202 and the piston washer center hole 198. In assembling the seal 186 onto the plunger 40', the threaded end 180 of the piston rod 178 is passed through both the center hole 220 of the retainer and the center hole 216 of the washer and is then screw threaded into the plunger cavity 176 at the distal end of the plunger 40'. This securely mounts the seal 186 to the plunger 40' in the position and orientation shown in FIGS. 13 and 14. This also mounts the dispensing piston 190 on the piston rod 178 and plunger 40' for sliding movement of the dispensing piston between the piston rod head 184 and the seal 186.

In operation, a liquid to be dispensed such as a lubricant, is supplied to the dispenser 142 through the supply conduit 156. The liquid can be pumped through the conduit from an external source or could be provided to the dispenser 142 by other methods such as those discussed earlier in describing the operation of the grease gun 20. The supply of liquid passes through the supply passage 158 and into the right side R of the dispensing chamber 146 as viewed in FIGS. 13 and 14. A source of air pressure is then connected to the air pressure inlet fitting 152. The dispenser 142 is then ready for operation. The operation of the air motor 140 is the same as that discussed above in describing the operation of the grease gun 20 and will not be repeated here. This operation of the air motor 140 causes the plunger 40' to reciprocate through the plunger bore 150. The plunger 40' is retracted through the plunger bore in response to the air motor piston 52 being moved to its retracted position in the cylinder 54 and is advanced through the plunger bore in response to the piston 52 being advanced through the cylinder 54.

When the plunger 40' is moved to its retracted position it moves to the right as viewed in FIGS. 13 and 14. This movement causes the plunger 40' to also pull the seal 186, and the dispensing piston 190 to the right. The seal 186 being secured to the plunger 40', moves with the plunger. However, the dispensing piston 190 is mounted for sliding movement on the exterior 182 of the piston rod 178. As the plunger 40' is moved to the right, the dispensing piston 190 will move to the left relative to the plunger 40' and the piston rod 178 to a retracted position of the dispensing piston 190 relative to the dispensing chamber 146 and a charge position of the dispensing piston 190 relative to the plunger 40'. This positioning of the dispensing piston 190 is shown in FIG. 14. It can be seen that with the dispensing piston 190 positioned at its charge position relative to the plunger 40' the seal 186 is separated from the dispensing piston 190 exposing the flow-through holes 200, 204 of the respective piston washer 194 and piston ring seat 196. This permits any liquid on the right side R of the dispensing chamber 146 to pass around the periphery of the seal 186, through the flow-through holes of the dispensing piston 190 and into the left side L of the dispensing chamber 146.

When the plunger 40' is moved to its advanced position, it moves to the left as viewed in FIGS. 13 and 14. As the plunger 40' moves to the left, the seal 186 secured to the plunger also moves to the left. However, the dispensing piston 190 previously moved to its charge position relative to the plunger 40' shown in FIG. 14 now slides across the piston rod exterior surface 182 toward the seal 186 until it occupies its discharge position relative to the plunger 40' where it abuts against the O-ring 188 of the seal 186. This seals closed the flow through holes of the dispensing piston. As the plunger 40' continues to advance to the left as viewed in FIGS. 13 and 14, the dispensing piston 190, in its advanced position relative to the dispensing chamber 146 shown in FIG. 13, is pushed to the left as shown in FIG. 13 pressurizing any liquid on the left side L of the dispensing chamber 146 causing it to pass through the dispensing hose 166 to the spigot 172 where it can be selectively dispensed by operation of the handle 174. This leftward movement of the dispensing piston 190 also allows liquid to pass through the conduit 156 and refill the right side R of the dispensing chamber 146 as the dispensing piston is moved to its advanced position relative to the dispensing chamber 146.

With the construction of the dispenser 142 described above, the supply of air pressure to the air pressure inlet 152 and the supply of liquid to the liquid inlet 154 can be continuous, with the dispensing of the liquid from the dispenser 142 under pressure being controlled by manipulation of the spigot handle 174. In addition, it can be see that by changing both the axial length and interior diameter dimensions of both the dispenser cylinder 54' and the dispenser chamber 146, the pressure of the liquid dispensed from the dispenser as well as the quantity of liquid dispensed from the dispenser can be easily adjusted.

While the present invention has been described by reference to a specific embodiment, it should be understood that modifications and variations of the invention may be constructed without departing from the scope of the invention defined in the following claims.

What is claimed is:

1. In an automatic air operated dispenser of the type in which a plunger is operated by the reciprocation of a piston in a cylinder caused by air pressure repeatedly advancing the piston against a return spring until a release is triggered to open a plurality of apertures on the piston, releasing the air pressure and allowing the piston to retreat under the force of the spring, the improvement comprising:

separate closures for each of the apertures operated by the release to open the apertures.

2. The automatic air operated dispenser of claim 1, wherein:

the dispenser includes an air chamber and a dispensing chamber that are separated by an internal wall of the dispenser, the internal wall has a plunger bore passing therethrough, the plunger bore has a smaller cross-sectional area than both the air chamber and the dispensing chamber, and the plunger is operatively connected to the piston in the air chamber and extends through the plunger bore into the dispensing chamber.

3. The automatic air operated dispenser of claim 2, wherein:

a dispensing piston is received for reciprocating movement in the dispensing chamber and is connected to the plunger for limited movement of the dispensing piston relative to the plunger.

4. The automatic air operated dispenser of claim 3, wherein:

the dispensing piston is mounted on the plunger for movement between charge and discharge positions of the dispensing piston relative to the plunger, the dispensing piston has at least one hole passing therethrough; and a seal is secured to the plunger in the dispensing chamber, when the dispensing piston is moved to its charge position it is spaced from the seal and when the dispensing piston is moved to its discharge position it abuts the seal and the seal closes the hole.

5. The automatic air operated dispenser of claim 4, wherein:

both the dispensing piston and the seal are comprised of stamped metal disks.

6. The dispenser of claim 1, wherein:

the piston comprises a shallow cup shaped member having a generally circular bottom surrounded by a sidewall; a generally flat disc; and a shallow dish shaped member having a generally circular bottom surrounded by a sidewall, and a generally radial lip extending from the sidewall.

7. An automatic pressure operated dispenser comprising:

a reciprocating plunger for ejecting liquid, a piston connected to the plunger for operating the plunger, the piston slidably mounted in a cylinder to move between a retracted position and an advanced position, a return spring for resiliently biasing the piston to its retracted position, a fitting for connecting the cylinder to a source of gas under pressure to advance the piston against the return spring, the piston having a plurality of apertures therein, each aperture having an individual seal, and a release for opening the individual seals to relieve the pressure behind the piston and allow it to retract under the force of the return spring.

8. The automatic pressure operated dispenser of claim 7, wherein:

each individual seal comprises a cup shaped seal member sized to fit over the aperture.

9. The automatic pressure operated dispenser of claim 7, wherein:

the dispenser includes a dispensing chamber that is separated from the cylinder by an internal wall of the dispenser, a plunger bore passes through the internal wall and the plunger extends from the piston through the plunger bore and into the dispensing chamber; and a dispensing piston is received in the dispensing chamber and is mounted to the plunger for reciprocating movement of the dispensing piston in the dispensing chamber in response to reciprocating movement of the plunger, the mounting of the dispensing piston to the plunger permitting movement of the dispensing piston between charge and discharge positions of the dispensing piston relative to the plunger.

10. The automatic pressure operated dispenser of claim 9, wherein:

the dispensing piston is mounted on the plunger for movement of the dispensing piston to its charge position relative to the plunger in response to the piston moving to its retracted position and for movement of the dispensing piston to its discharge position relative to the plunger in response to the piston moving to its advanced position.

11. The automatic pressure operated dispenser of claim 9, wherein:

the dispensing piston has at least one hole passing therethrough; and a seal is secured to the plunger in the dispensing chamber and is positioned relative to the dispensing piston so that when the dispensing piston is moved to its charge position it is spaced from the seal and when the dispensing piston is moved to its discharge position it abuts the seal and the seal closes the hole.

12. The automatic pressure operated dispenser of claim 11, wherein:

the seal consists essentially of a pair of stamped metal disks secured together side-by-side and a resilient ring that extends around the pair of disks.

13. The automatic pressure operated dispenser of claim 9, wherein:

the dispensing piston consists essentially of a pair of stamped metal disks secured together side-by-side and a resilient ring that extends around the pair of disks.

14. An automatic pressure operated dispenser comprising:

a cylinder and a dispensing chamber with an internal wall therebetween;

a plunger bore passing through the internal wall;

a plunger passing through the plunger bore;

a piston mounted in the cylinder for reciprocating movement of the piston between retracted and advanced positions relative to the cylinder, the piston being connected to the plunger;

a dispensing piston mounted in the dispensing chamber for reciprocating movement of the dispensing piston between retracted and advanced positions of the dispensing piston relative to the dispensing chamber, the dispensing piston is connected to the plunger for movement of the dispensing piston between charge and discharge positions of the dispensing piston relative to the plunger, the dispensing piston has at least one hole passing therethrough;

a seal is secured to the plunger in the dispensing chamber and is positioned relative to the dispensing piston so that when the dispensing piston is moved to its charge position it is spaced from the seal and when the dispensing piston is moved to its discharge position it abuts the seal and the seal closes the hole; and, the seal is a rigid disk secured to the plunger adjacent the dispensing piston, the rigid disk supports a resilient ring on a side of the rigid disk that is opposed by the dispensing piston, and the resilient ring engages against the dispensing piston with the hole positioned within the resilient ring when the dispensing piston is moved to its discharge position relative to the plunger.

15. The automatic pressure operated dispenser of claim 14, wherein:

the dispensing piston is mounted on the plunger for movement of the dispensing piston to its charge position relative to the plunger in response to the plunger moving the dispensing piston to its retracted position relative to the dispensing chamber and for movement of the dispensing piston to its discharge position relative to the plunger in response to the plunger moving the dispensing piston to its advanced position relative to the dispensing chamber.

16. The automatic pressure operated dispenser of claim 14, wherein:
the dispensing piston is mounted on the plunger for movement of the dispensing piston to its charge position relative to the plunger in response to the piston moving to its retracted position and for movement of the dispensing piston to its discharge position relative to the plunger in response to the piston moving to its advanced position.

17. The automatic pressure operated dispenser of claim 14, wherein:
the dispensing piston consists essentially of a pair of stamped metal disks secured together side-by-side and a resilient ring that extends around the pair of disks.

18. An automatic pressure operated dispenser comprising:
a cylinder and a dispensing chamber with an internal wall therebetween;
a plunger bore passing through the internal wall;
a plunger passing through the plunger bore;
a piston mounted in the cylinder for reciprocating movement of the piston between retracted and advanced positions relative to the cylinder, the piston being connected to the plunger;
a dispensing piston mounted in the dispensing chamber for reciprocating movement of the dispensing piston between retracted and advanced positions of the dispensing piston relative to the dispensing chamber, the dispensing piston is connected to the plunger for movement of the dispensing piston between charge and discharge positions of the dispensing piston relative to the plunger, the dispensing piston has at least one hole passing therethrough;
a seal is secured to the plunger in the dispensing chamber and is positioned relative to the dispensing piston so that when the dispensing piston is moved to its charge position it is spaced from the seal and when the dispensing piston is moved to its discharge position it abuts the seal and the seal closes the hole; and,
the seal consists essentially of a pair of stamped metal disks secured together side-by-side and a resilient ring that extends around the pair of disks.

\* \* \* \* \*